March 10, 1953 P. A. TATUSKO ET AL 2,631,092

METHOD OF ETCHING PLATES

Filed Dec. 15, 1950 3 Sheets-Sheet 1

Inventors
PHILIP A. TATUSKO
RICHARD E. FREDERICK, JR.

By Geoffrey Knight
Attorney

Inventors
PHILIP A. TATUSKO
RICHARD E. FREDERICK, JR.
By Geoffrey Knight
Attorney Inventors
PHILIP A. TATUSKO
RICHARD E. FREDERICK, JR.
By Geoffrey Knight
Attorney Patented Mar. 10, 1953 2,631,092

UNITED STATES PATENT OFFICE 2,631,092

METHOD OF ETCHING PLATES

Philip A. Tatusko and Richard E. Frederick, Jr., Endicott, N. Y., assignors to International Business Machines Corporation, New York, N. Y., a corporation of New York Application December 15, 1950, Serial No. 200,978

2 Claims. (Cl. 41—43)

This invention relates to methods of etching and more particularly to a molded resist method for selectively etching a plate.

An object of the invention is to provide a simplified and improved method for selectively etching code plates or the like.

Another object of the invention is to devise a procedure for selectively etching plates which requires fewer operations than many other methods now in use and to devise a procedure which is particularly adapted to the etching of plates on a mass production scale.

Still another object of the invention is to devise a simplified procedure for selectively etching code plates or the like on a mass production scale and still maintain a high degree of accuracy as well as adequate protection of the sides of the etched surfaces against undercutting.

The present invention will be disclosed as applied to a code plate of the type that is included in some record controlled equipment wherein it is selectively positioned to control wire printing elements. Code plates of this nature are selectively etched and require not only an accurate etch but one which is deep and free from undercutting. Many methods have been tried out in an endeavor to find an efficient method of etching code plates accurately and heretofore the method which has proven the most satisfactory has been the process disclosed in the application of E. W. Gardinor, Serial No. 201,008. However, the process disclosed in said application includes a photoengraving masking procedure for each code plate produced. It is a particular object of the present invention to improve the efficiency of said process, by substituting a more rapid masking procedure for that used in said process.

Other objects of the invention will be pointed out in the following description and claims and illustrated in the accompanying drawings, which disclose, by way of example, the principle of the invention and the best mode, which has been contemplated, of applying that principle.

As in the process described in the aforesaid Gardinor application, the manufacture of an etched article, such as a code plate, starts with a blank 12 (Figs. 3 and 4) slotted, as at 18, to segregate its surface into a regular pattern of raised elements 19. Some of the raised elements are to be etched away, while others are to remain, in the form of the desired final pattern. Preparation for the selective etching includes the application of a resist to the slotted code plate, in a manner now to be described.

Figure 1:
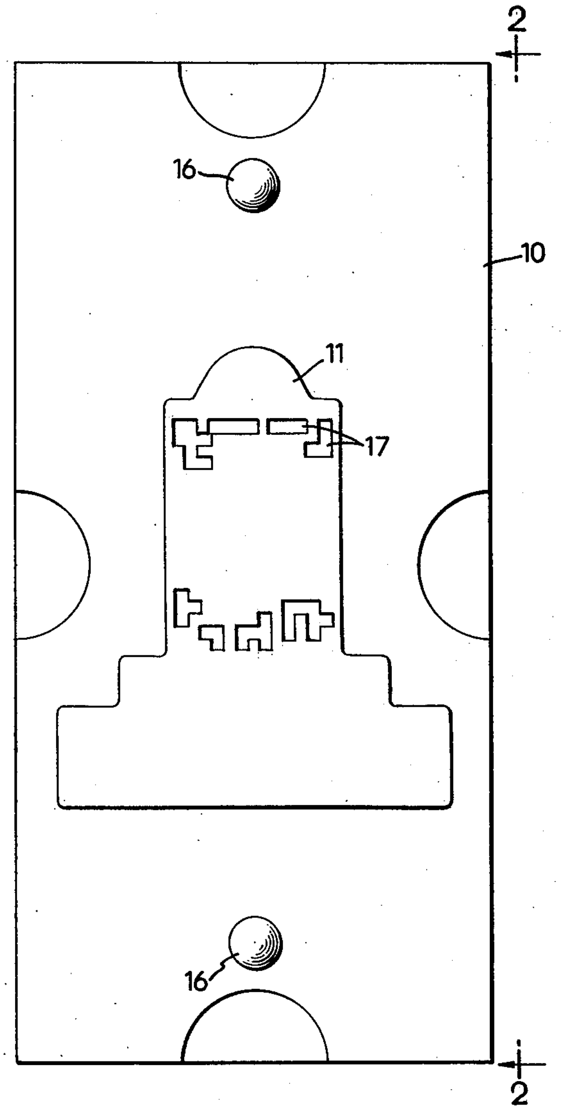
Fig. 1 is a plan view of the die plate with the reverse pattern molding plate mounted thereon.
Figure 2:
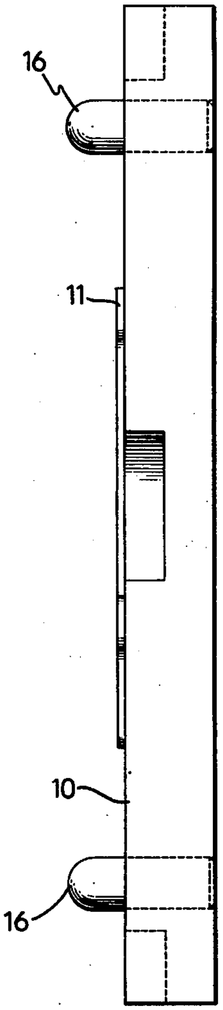
Fig. 2 is a side elevation view of the die plate and reverse pattern molding die.
Figure 3:
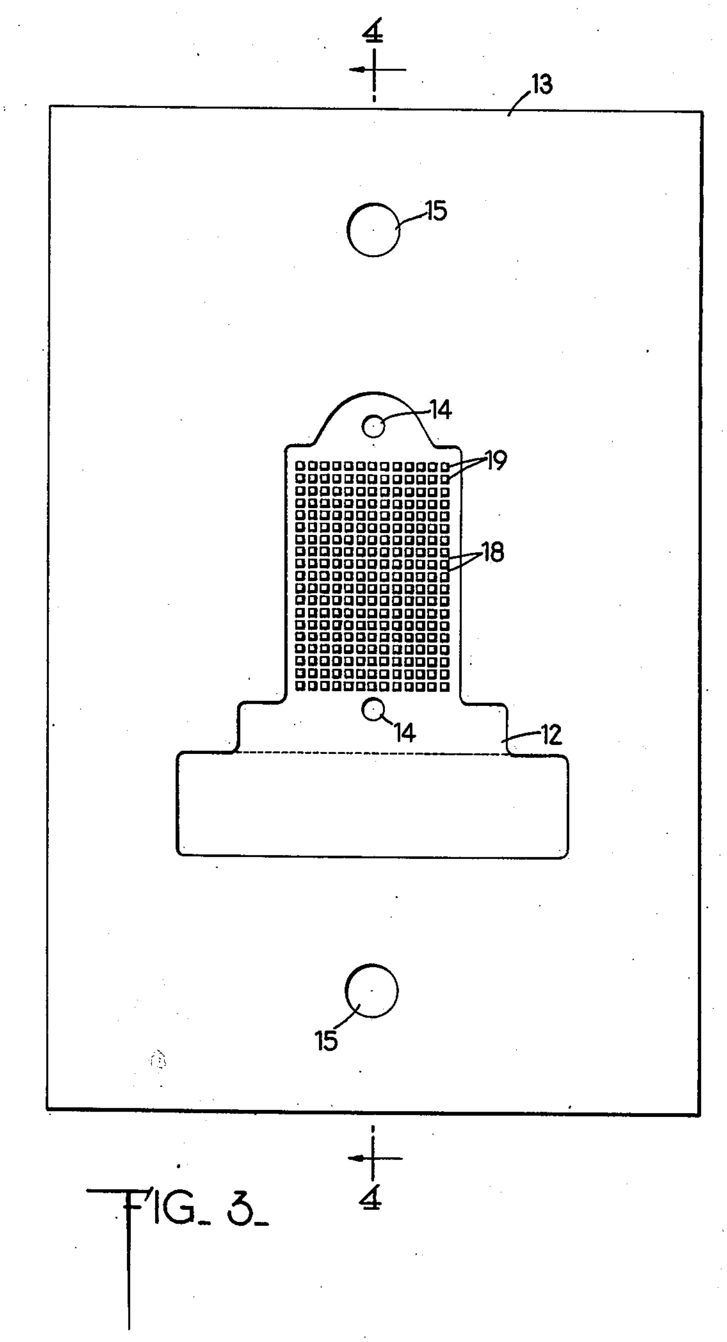
Fig. 3 is a plan view of the die cavity plate and blank code plate.
Figure 4:
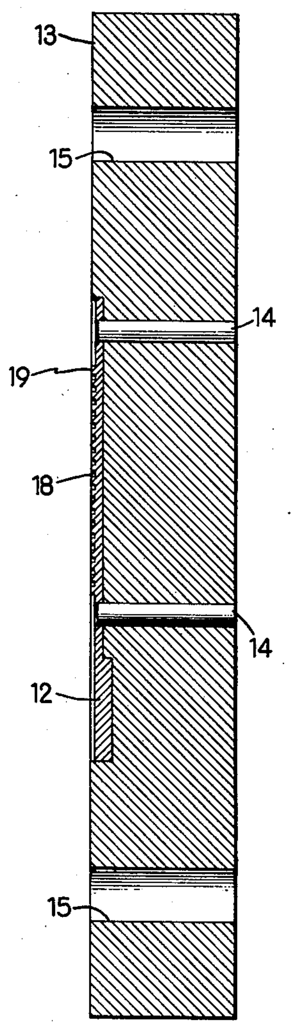
Fig. 4 is a section on the line 4—4 of Fig. 3.

Referring to Figs. 1 and 2, there may be seen a typical steel die plate 10 of the type generally used in molding presses. For the present application the die plate 10 has machined on its surface a flat projection or pad 11 which will hereinafter be referred to as the molding plate. This molding plate is given the same shape as the particular code plate that is to be etched such as, for example, the blank code plate 12 located in the cavity of a die plate 13 as shown in Figs. 3 and 4.

It can be seen that the cavity and the molding plate occupy the same relative position on the die plates so that when said die plates are pressed together the molding plate will overlie the code plate 12. Correct alignment between the code plate 12 and the molding plate is maintained during the molding operations by securing the code plate blank in the cavity by means of two pins 14 to guard against any movement of said code plate. Also, the die plate 13 is provided with two positioning holes 15 adapted to receive the dowel pins 16 of die plate 10 when the die plates are pressed together.

In accordance with the method of the invention, the force of the molding plate is to have a reverse pattern of the pattern that is to be left unetched on the face of the code plate blank 12. In other words, where a code element, or group of code elements, is to be left in relief on the code plate, a corresponding recess in the molding plate, such as is indicated at 17 on Fig. 1, will be superimposed over that particular code element, or group of code elements. By the same token, the molding plate will be provided with projecting surfaces which will be superimposed on those areas on the surface of the code plate which are to be etched out.

The reverse pattern is generally etched on the molding plate by any convenient etching method although the preferred method is a photoengraving process. Briefly, this photoengraving process involves the following steps: A copper plated molding plate blank is coated on one surface with a sensitized coating which is exposed through a glass negative of the pattern to be etched into the mold plate. The coating is then rolled with etching ink and developed, leaving bare those portions of the metal surface of the molding block which are to be etched. The pattern of ink is then touched up, powdered with dragon's blood, and burned in. The sides and back of the molding plate are covered with masking tape and the plate is etched to the desired depth, such as .006 or .007 inch. The etching ink and masking tape are burned off and the copper plate may be stripped off and the molding plate chrome plated.

The improved process for selectively etching the code plate or the like involves, first of all, taking a precision cast blank of the code plate and finishing it to final dimensions except for the desired pattern of projections. Then a series of slots 18 are formed in criss-cross fashion on the surface of the blank. Such slots are generally milled into a depth approximately equal to the depth of the required etch and in the example shown in Fig. 3 there is formed a pattern of blocks 19 separated by the slots or vertical walled channels 18.

The shape of the segregated areas of the code plate is not limited to the block arrangement illustrated, but may be any shape, such as circular areas surrounded by vertical walled channels arranged in circular fashion, or other forms depending upon the pattern that is to be etched on the code plate.

In the next operation, the unloaded die plates 10 and 13 are placed on electrically heated platens of a suitable molding press and the temperature of the press is raised to approximately 300° F. When the die plates reach this temperature they are removed and given a coating of grease or mold release to facilitate the removal of the code plate after the molding operation.

The code plate blank 12 is then located in the cavity of the die plate 13 by means of the two pins 14 and the slotted face is coated with a suitable resist material such as a Bakelite plastic which has been sifted through a #32 x 32 or finer mesh screen. The amount of plastic generally used for the illustrated code plate blank is from 55 to 60 grains by weight or a volume 7/8'' dia. by 5/8'' long. The plastic should be spread out evenly over the code plate blank by some flat instrument such as a putty knife.

The die plate 10 is placed over the die plate 13 and cavity by means of the dowel pins 16 and both die plates are placed between the press platens of the molding press. The platens are brought slowly together and the gage pressure raised to 2000 lbs. per sq. inch. The pressure is maintained at this level for approximately 20 seconds to give the plastic a chance to soften. When the plastic becomes soft, the pressure is raised to 6000 lbs. per sq. inch, bringing the force of the molding plate into contact with the code plate.

Figure 5:
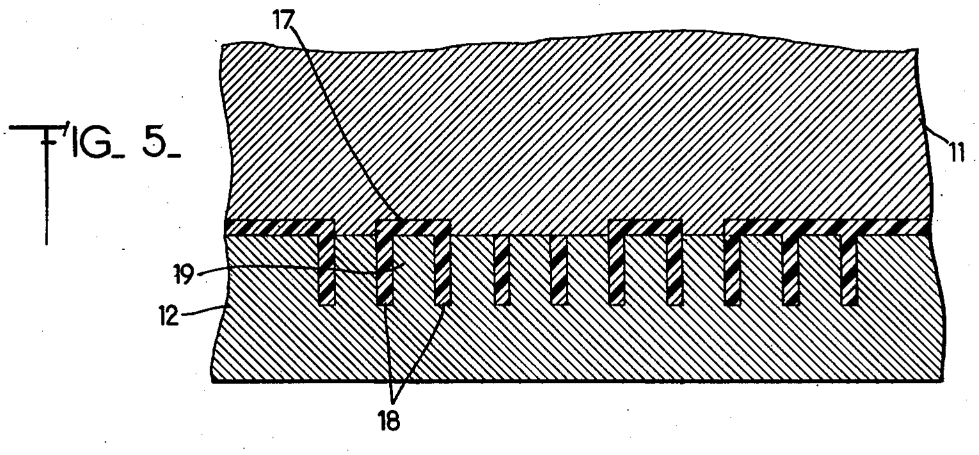
Fig. 5 is a diagrammatic view showing the resist material being selectively molded onto the blank code plate.

Fig. 5 is a diagrammatic showing of the relationship between the force of the molding plate, the plastic, and the code plate blank at this stage of the process. The heat and pressure of the press reduces the plastic to a fluent state and the force of the molding plate makes metal contact with the code plate by forcing substantially all of the plastic into the slots in the code plate and the recesses of the molding plate. As shown in Fig. 5, the width of a recess 17 in the mold plate 11 exceeds the width of a code element 19 by the width of the two adjacent slots 18, whereby the plastic is molded to completely encase the code element. The 6000 lbs. per sq. inch pressure is maintained for about four minutes during which time the plastic cools slightly and hardens.

After the plastic hardens, the platens of the press are separated and the two die plates are separated using die bars. The code plate blank is now encased in plastic except where the force came in contact with the code plate as shown in Fig. 5. The plastic in the slots and recesses bonded together to completely encase those blocks on the code plate which conform to the desired pattern and consequently are not to be etched. The code plate is now removed from the cavity by means of the usual knock-out hole.

Generally a light flash is left on the areas where the force of the molding plate came in contact with the code plate. This flash may be cleaned off by a light sandblast of about 25 lbs. per sq. inch pressure. The sandblasting will leave the areas to be etched out clean and bright and at this point the code plate should be inspected to make sure that the areas to be etched are clean. Any excess plastic can be scratched out with a sharp scriber. If in the sandblasting any of the plastic casing around the blocks or areas that are not to be etched was accidentally knocked off, it should be covered with a resisting asphalt varnish.

Figure 6:
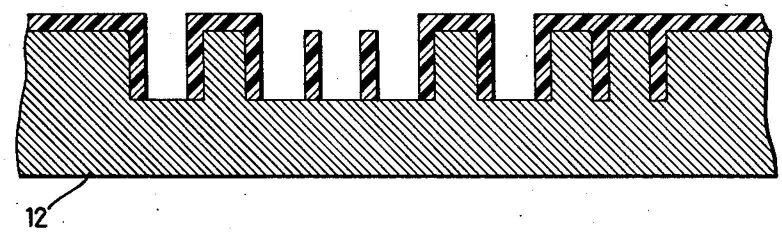
Fig. 6 is a diagrammatic view showing the code plate after etching.

The code plate is then covered around the edges and on the back with masking tape and placed in an etching machine utilizing a vertical spray. The plate is subjected to the action of an etching acid, preferably 40 degree Baumé ferric chloride, for approximately one hour and ten minutes at which time the unprotected areas of the plate will be etched out to a depth of about .024 inch. Fig. 6 is a diagrammatic showing of how the code plate looks after etching and before the resist material or plastic has been removed.

Figure 7:
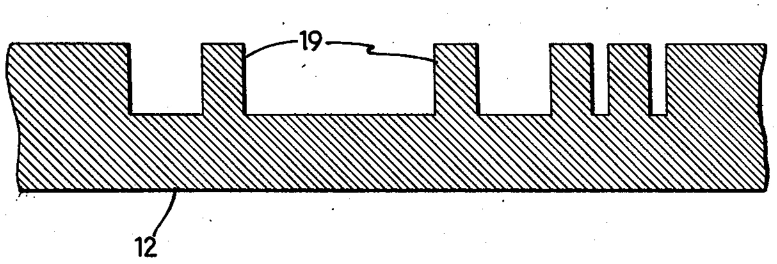
Fig. 7 is a diagrammatic view showing the etched code plate with the resist material removed.

After etching, the code plate is removed from the etching machine and placed in an oven heated to 900° F. This heat will burn the plastic material and the code plate should be left in the oven until the plastic is completely burned out. The code plate may then be soaked in a solution of 20% muriatic acid and 80% alcohol for a few minutes to remove the scale formed by burning out the plastic and then cleaned with a soft brass bristle brush and soap. Fig. 7 is a diagrammatic showing of the finished code plate.

It can be readily understood that once the molding plate is made and the molding press conditioned for operation that a great many code plates may be processed at a fairly rapid rate and with comparative ease. The individual steps required to process the code plate are of a much less exacting nature than is required by other processes such as the photoengraving process previously mentioned.

Another rather important feature of the invention resides in the fact that a precision cast blank, finished to size with the milled slots machined on the face, can be used. In the standard photoengraving method this is not possible as it is necessary to use a blank which has approximately 1/4 inch of extra metal on the face. This extra border is necessary to insure that the sensitized solution, used to obtain the print, will coat evenly on the printing area. The sensitized solution generally builds up a border along the edge of any plate coated and is unsatisfactory in obtaining a good print. Eliminating this coating operation thus eliminates the use of a special blank that would involve additional machining operations after the etching was completed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A method of selectively etching a plate which includes the steps of forming channels to segregate areas on the face of a plate, coating the face of said plate with a moldable resist material, selectively molding said material to form walls of resist between said areas and a coating of resist merging with the adjacent walls of resist, over those areas which are to be left unetched, subjecting said plate to the action of an etching fluid to etch away the uncoated areas, and removing the resist material from said plate.

2. A method of selectively etching a plate which includes the steps of forming channels to segregate areas on the face of a plate, coating the face of said plate with a moldable resist material, placing a reverse pattern die adjacent said coated face, subjecting said die and plate to pressure and heat to mold said material to form walls of resist between said areas and a coating of resist merging with the walls of resist, over those areas which are to be left unetched, subjecting said plate to the action of an etching fluid to etch away the uncoated areas, and removing the resist material from said plate.

PHILIP A. TATUSKO.
RICHARD E. FREDERICK, Jr.

REFERENCES CITED

The following references are of record in the file of this patent:

UNITED STATES PATENTS

| Number | Name | Date |
|---|---|---|
| 654,867 | Baker | July 31, 1900 |
| 792,313 | Calmels | June 13, 1905 |
| 1,950,684 | Mark | Mar. 13, 1934 |
| 2,107,294 | Griswold | Feb. 8, 1938 |
| 2,257,143 | Wood | Sept. 30, 1941 |